(12) United States Patent
Collin et al.

(10) Patent No.: US 11,413,912 B2
(45) Date of Patent: Aug. 16, 2022

(54) SYSTEM AND METHOD FOR TEMPERATURE COMPENSATION OF DRIVE OVER READER PRESSURE MEASUREMENT

(71) Applicant: The Goodyear Tire & Rubber Company, Akron, OH (US)

(72) Inventors: Pierre Jules A. Collin, Vance (BE); Abhijit Ganguly, Hudson, OH (US); Andreas Michale Thomas Pietsch, Duelmen (DE); Stefan Bussmann, Dorsten (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 147 days.

(21) Appl. No.: 17/122,191

(22) Filed: Dec. 15, 2020

(65) Prior Publication Data

US 2022/0185044 A1    Jun. 16, 2022

(51) Int. Cl.
*B60C 23/06*    (2006.01)

(52) U.S. Cl.
CPC .................. *B60C 23/06* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/0246; B60C 23/0498; B60C 23/02; B60C 99/006;
(Continued)

(56) References Cited

U.S. PATENT DOCUMENTS 6,400,261 B1   6/2002  Starkey et al.
6,518,877 B1   2/2003  Starkey et al.
(Continued)

FOREIGN PATENT DOCUMENTS

JP    S58112812 A    7/1983

OTHER PUBLICATIONS

Extended European Search report issued in the corresponding European application and received by Applicant dated May 16, 2022.

*Primary Examiner* — Andre J Allen
(74) *Attorney, Agent, or Firm* — Edward T. Kennedy

(57) ABSTRACT

A system compensates a drive over reader tire pressure measurement. The system includes a drive over reader, which includes a sensor array. A pressure indication is determined for each tire in a group of tires by the drive over reader. A recommended cold pressure for the tires is provided. An adjusted recommended pressure for the tires is determined from the pressure indication and the recommended cold pressure, and accounts for temperature effects on the tires. An adjusted low pressure threshold is set at a predetermined level below the adjusted recommended pressure. A notice is generated by the drive over reader for each tire that includes an adjusted recommended pressure below the adjusted low pressure threshold.

20 Claims, 5 Drawing Sheets

(58) Field of Classification Search
CPC ............ B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/0484; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0032; B60C 23/0457; B60C 23/12; B60C 25/18; B60C 11/13; B60C 23/0418; B60C 23/0469; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/31; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 23/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06

USPC .................................................. 73/146–146.8

See application file for complete search history.

(56) References Cited

U.S. PATENT DOCUMENTS

| | | |
|---|---|---|
| 6,591,671 B2 | 7/2003 | Brown |
| 6,823,728 B1 | 11/2004 | Barnes |
| 7,222,522 B2 | 5/2007 | Monguzzi et al. |
| 7,269,997 B2 | 9/2007 | Dale, Jr. et al. |
| 7,578,180 B2 | 8/2009 | Lionetti et al. |
| 7,942,048 B2 | 5/2011 | Pingel et al. |
| 7,969,293 B2 | 6/2011 | Benedict et al. |
| 8,065,911 B2 | 11/2011 | Taylor et al. |
| 8,312,766 B2 | 11/2012 | Pingel |
| 8,621,919 B2 | 1/2014 | Pingel |
| 8,833,152 B2 | 9/2014 | Schaefer |
| 9,000,923 B2 | 4/2015 | Benedict |
| 9,057,658 B2 | 6/2015 | Rose et al. |
| 9,079,461 B2 | 7/2015 | Suh et al. |
| 9,183,423 B2 | 11/2015 | Batcho, Sr. et al. |
| 9,677,973 B1 | 6/2017 | Carroll et al. |
| 9,805,697 B1 | 10/2017 | Dorrance et al. |
| 10,789,773 B2 | 9/2020 | Zoken et al. |
| 2001/0004236 A1* | 6/2001 | Letkomiller ............ B60C 23/20 340/595 |

(56) References Cited

U.S. PATENT DOCUMENTS

2017/0254727 A1   9/2017  Zoken et al.
2017/0350781 A1  12/2017  Ledoux et al.
2022/0185037 A1*  6/2022  Collin .................. G01L 17/005

* cited by examiner

SYSTEM AND METHOD FOR TEMPERATURE COMPENSATION OF DRIVE OVER READER PRESSURE MEASUREMENT

FIELD OF THE INVENTION

The invention relates generally to tire monitoring. More particularly, the invention relates to systems and methods that monitor the air pressure inside of a vehicle tire when the vehicle is driven over a reader or station. Specifically, the invention is directed to a drive over reader system that accounts for high temperature effects on tire pressure from vehicle operation.

BACKGROUND OF THE INVENTION

Multiple pneumatic tires support a vehicle, and are designed to perform for relatively long periods of time. However, even long-life pneumatic tires are subject to air pressure losses due to puncture by nails and other sharp objects, temperature changes, and/or diffusion of air through the tire itself.

Since air diffusion reduces tire pressure over time, the pneumatic tires may repeatedly become underinflated. Accordingly, vehicle operators or fleet operators must in turn repeatedly act to maintain recommended air pressures in the vehicle tires to avoid reduced fuel economy, tire life, and/or vehicle braking and handling performance. To assist in the maintenance of recommended tire pressure, various types of systems that monitor the air pressure inside the tire have been developed.

One approach to the monitoring and/or measurement of tire pressure has been to measure the pressure of a tire mounted on a vehicle as the vehicle drives over a station and the tire passes over a sensor mounted in the station, which is known in the art as a drive over reader. As the tire drives onto the drive over reader, the reader measures the pneumatic pressure inside the tire. For example, an array of load sensors may be disposed in the drive over reader, which measures the force exerted by the tire.

The tire pressure is determined from the measured force, and may incorporate tire information and/or vehicle information. The advantages of determining tire pressure with a drive over reader include positioning of the tire over the reader contact surface during a short time interval, which enables the pressure to be determined without invading or accessing the tire cavity.

As with any measurement technique, the precision and repeatability of the pressure determination by the drive over reader are important considerations. For example, the determination of tire pressure by a drive over reader may be influenced by tire temperature. Regarding tire temperature, most drive over readers are not capable of detecting the temperature of the tire. However, operation of the vehicle often increases the tire temperature, which typically increases tire pressure. By way of example, a ten (10) degree Fahrenheit increase in temperature may increase the pressure in a tire by about one pound per square inch (PSI).

Thus, when tire pressure is measured by the drive over reader after extended vehicle operation, the pressure reading may reflect an increased pressure due to the increased tire temperature. The low pressure threshold for a drive over reader is typically based on a recommended inflation pressure for the tire, which is a recommended cold pressure (RCP). Because the measured pressure may be artificially high due to temperature, a tire that has an inflation pressure below the low pressure threshold using recommended cold pressure may undesirably be designated as having an acceptable pressure level.

As a result, there is a need in the art for a system and method for a drive over reader that accounts for high temperature effects on a tire from vehicle operation.

SUMMARY OF THE INVENTION

According to an aspect of an exemplary embodiment of the invention, a system for compensation of a drive over reader tire pressure measurement is provided. The system includes a drive over reader, which includes a sensor array. A pressure indication is determined for each tire in a group of tires by the drive over reader. A recommended cold pressure for the tires is provided. An adjusted recommended pressure for the tires is determined from the pressure indication and the recommended cold pressure, and accounts for temperature effects on the tires. An adjusted low pressure threshold is set at a predetermined level below the adjusted recommended pressure. A notice is generated by the drive over reader for each tire that includes an adjusted recommended pressure below the adjusted low pressure threshold.

According to another aspect of an exemplary embodiment of the invention, a method for compensating a drive over reader tire pressure measurement is provided. The method includes the step of providing a drive over reader, which includes a sensor array. A pressure indication is determined for each tire in the group of tires with the drive over reader, and a recommended cold pressure for the tires is provided. An adjusted recommended pressure for the tires is determined from the pressure indication and the recommended cold pressure, and accounts for temperature effects on the tires. An adjusted low pressure threshold is set at a predetermined level below the adjusted recommended pressure, and a notice is generated with the drive over reader for each tire that includes an adjusted recommended pressure below the adjusted low pressure threshold.

BRIEF DESCRIPTION OF THE DRAWINGS

The invention will be described by way of example and with reference to the accompanying drawings, in which.

Similar numerals refer to similar parts throughout the drawings.

DEFINITIONS

"Axial" and "axially" means lines or directions that are parallel to the axis of rotation of the tire.

"Circumferential" means lines or directions extending along the perimeter of the surface of the annular tread perpendicular to the axial direction.

"Equatorial centerplane (CP)" means the plane perpendicular to the tire's axis of rotation and passing through the center of the tread.

"Footprint" means the contact patch or area of contact created by the tire tread with a flat surface as the tire rotates or rolls.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint of the tire as measured under normal load and tire inflation, the lines being parallel to the equatorial centerplane.

"Net contact area" means the total area of ground contacting tread elements between the lateral edges around the entire circumference of the tread of the tire divided by the gross area of the entire tread between the lateral edges.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Tread element" or "traction element" means a rib or a block element defined by a shape having adjacent grooves.

"Tread Arc Width" means the arc length of the tread of the tire as measured between the lateral edges of the tread.

DETAILED DESCRIPTION OF THE INVENTION

Figure 1:
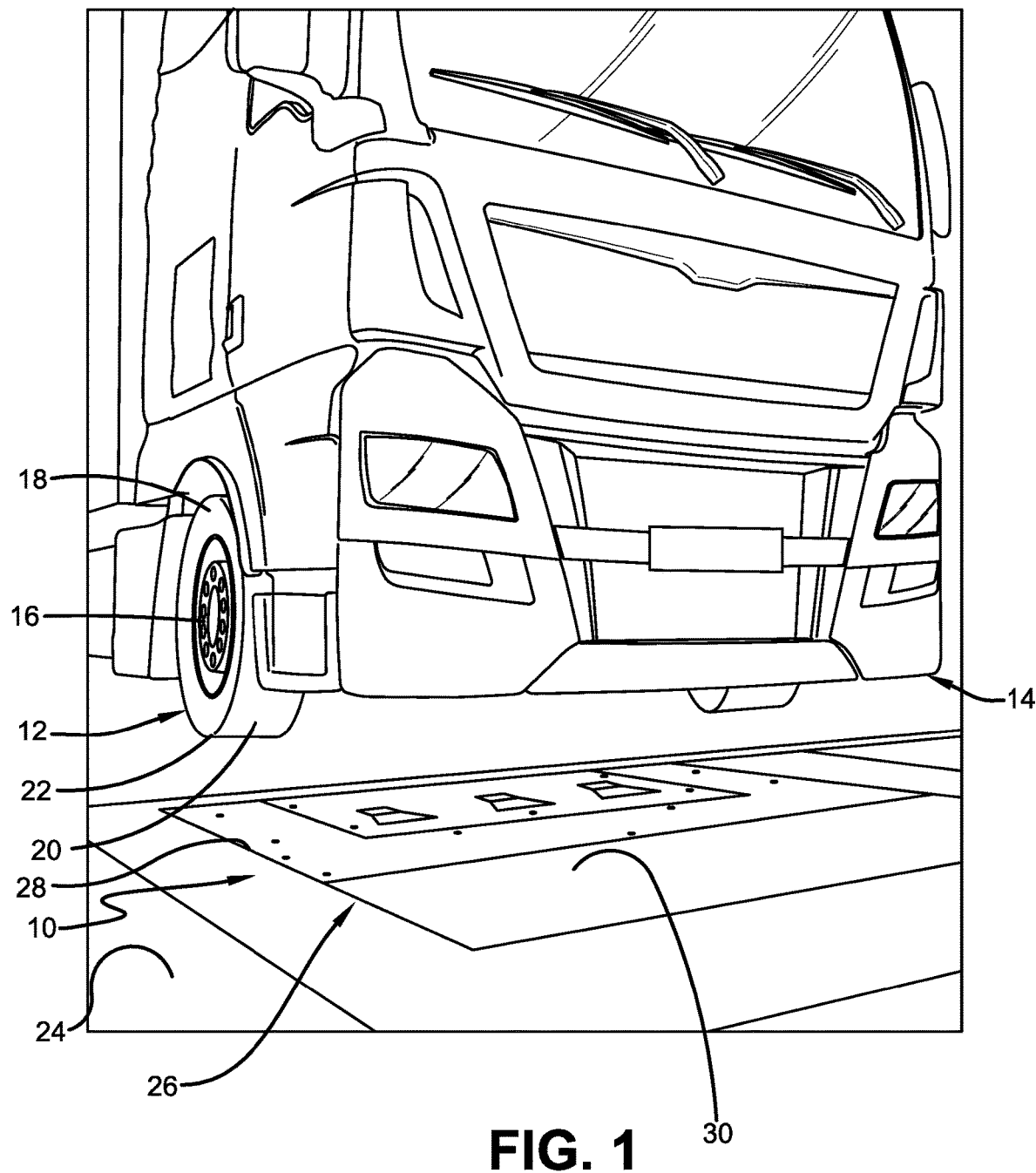
FIG. 1 is a schematic perspective view of an exemplary embodiment of the system for compensation of a drive over reader tire pressure measurement of the present invention, with the drive over reader shown installed in the ground and a vehicle approaching the system.

With reference to FIGS. 1 through 5, an exemplary embodiment of the system for compensation of a drive over reader tire pressure measurement of the present invention is indicated at 10. As shown in FIG. 1, the system 10 assesses the pressure of each tire 12 supporting a vehicle 14. It is to be understood that the vehicle 14 may be any vehicle type, and is shown by way of example as a commercial vehicle. In addition, the vehicle 14 may include any number of tires 12, and the system 10 may evaluate the pressure in any number of the tires on the vehicle.

The tires 12 are of conventional construction, and each tire is mounted on a respective wheel 16 as known to those skilled in the art. Each tire 12 includes a pair of sidewalls 18 that extend to a circumferential tread 20. As each tire 12 rolls over the ground 24, a footprint 22 is created, which is the area of contact of the tread 20 with the ground.

Figure 2:
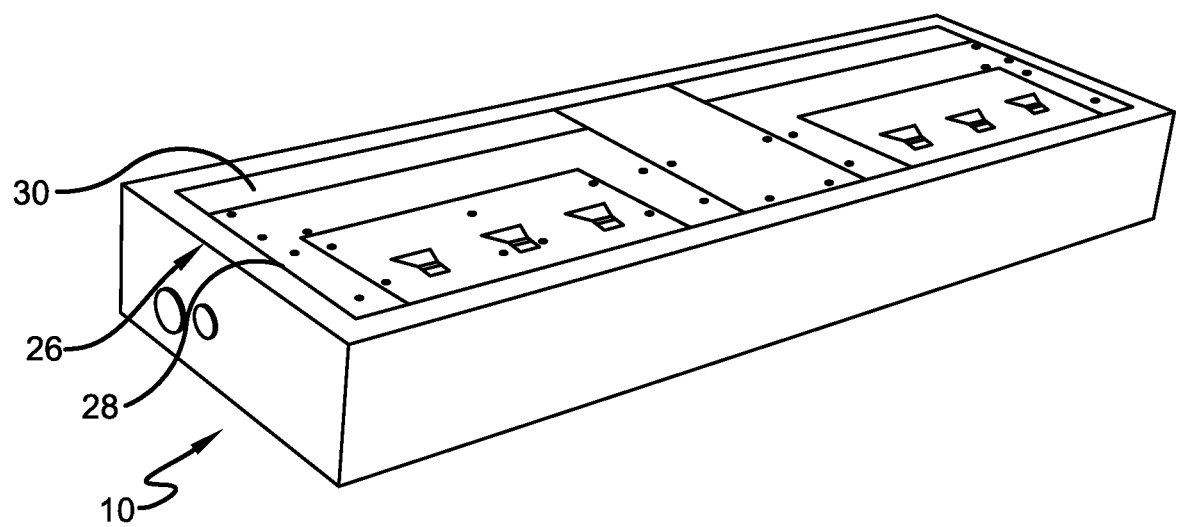
FIG. 2 is a schematic perspective view of the system for compensation of a drive over reader tire pressure measurement of the present invention shown in FIG. 1.
Figure 3:
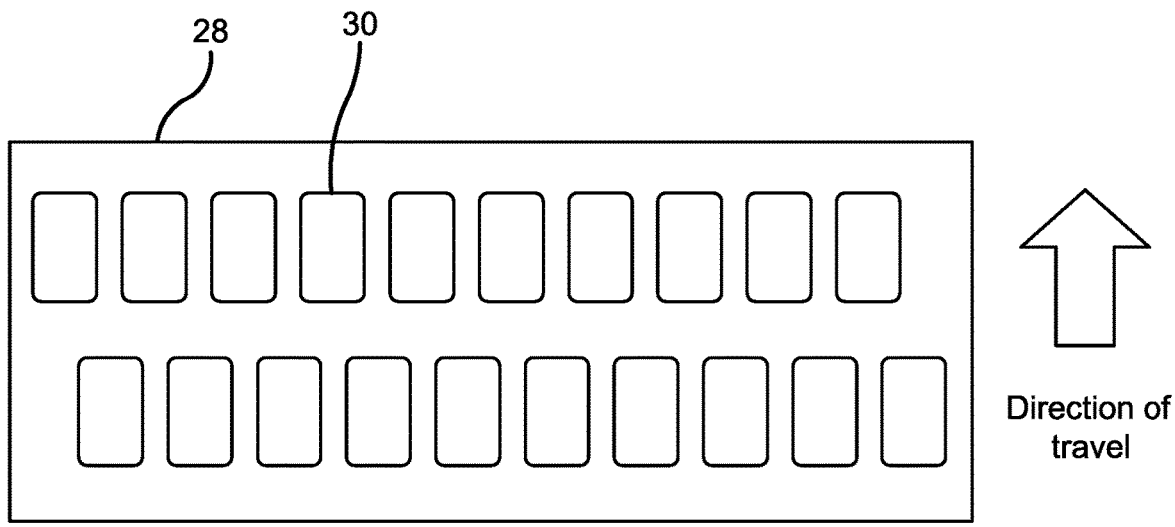
FIG. 3 is a schematic representation of an array of load sensors of the system shown in FIG. 1.

With additional reference to FIGS. 2 and 3, the system 10 includes a drive over reader 26, which is mounted in or on the ground 24. The drive over reader 26 includes a housing 28 and at least one sensor 30 mounted in the housing. Preferably, an array of load sensors 30 is mounted in the housing 28. The driver of the vehicle 14 directs the vehicle over the drive over reader 26, which causes each tire 12 to roll over the reader. When the tire 12 is positioned over the sensor array 30, the array measures the force exerted by the tire.

The pressure of the tire 12 is determined from the force measured by the sensor array 30, and may incorporate tire information and/or vehicle information. An exemplary technique for determining the pressure of the tire 12 is described in U.S. Pat. No. 7,942,048, which is owned by the Assignee of the current Application, The Goodyear Tire & Rubber Company, and is incorporated herein by reference. By employing the drive over reader 26, the pressure of the tire 12 is determined without invading or accessing the tire cavity. The drive over reader 26 includes, or is in electronic communication with, a processor to determine the pressure of the tire 12 from the sensor array 30.

Figure 4A:
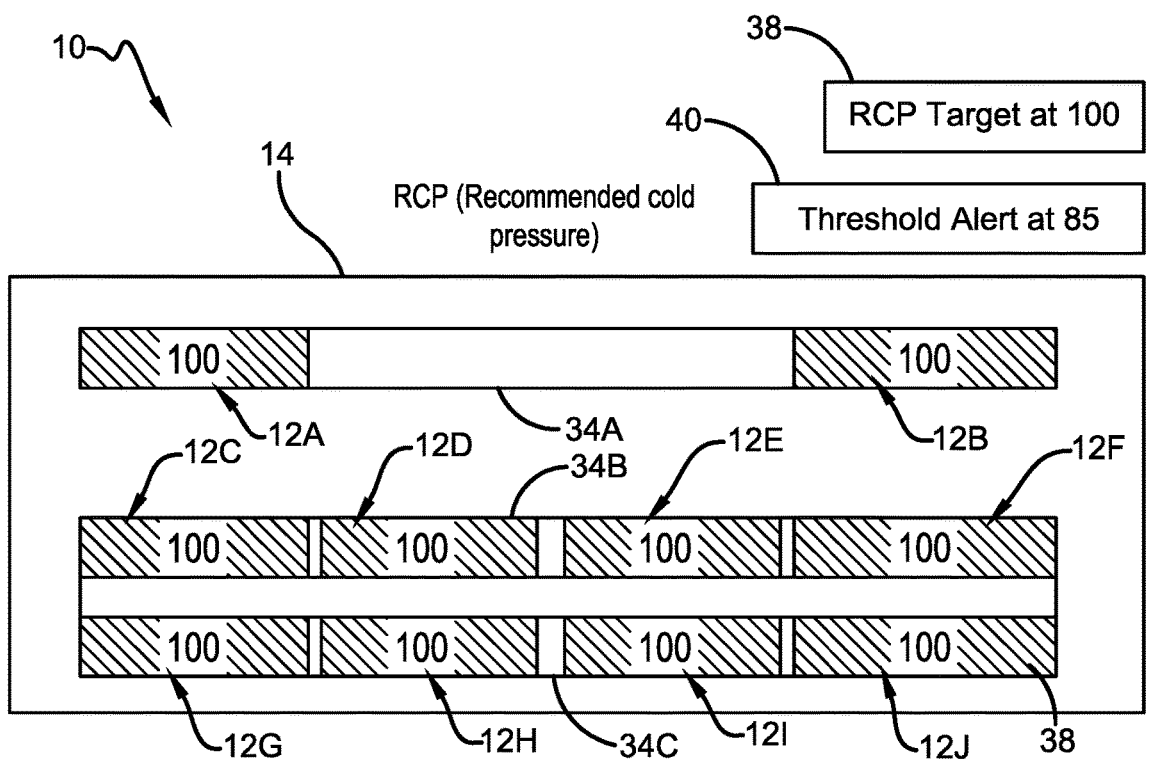
FIG. 4A is a schematic representation of a first aspect of the system for compensation of a drive over reader tire pressure measurement of the present invention shown in FIG. 1.
Figure 4B:
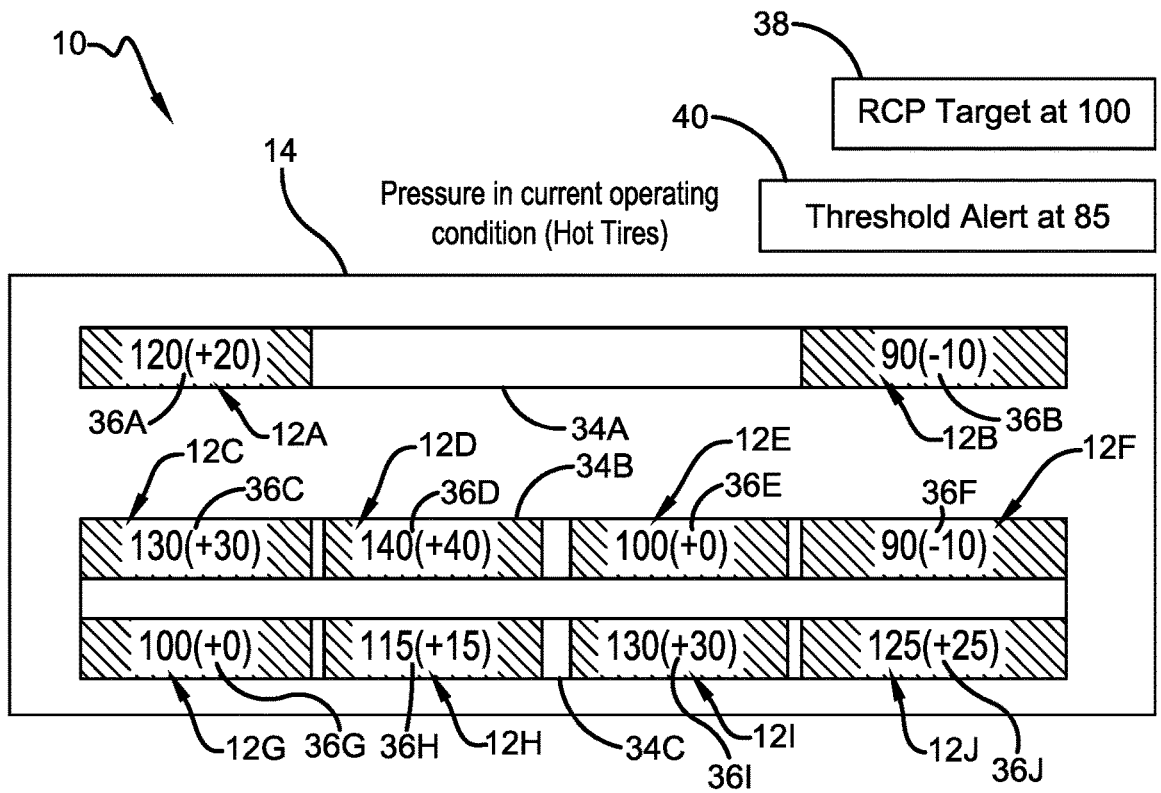
FIG. 4B is a schematic representation of a second aspect of the system for compensation of a drive over reader tire pressure measurement of the present invention shown in FIG. 1.
Figure 4C:
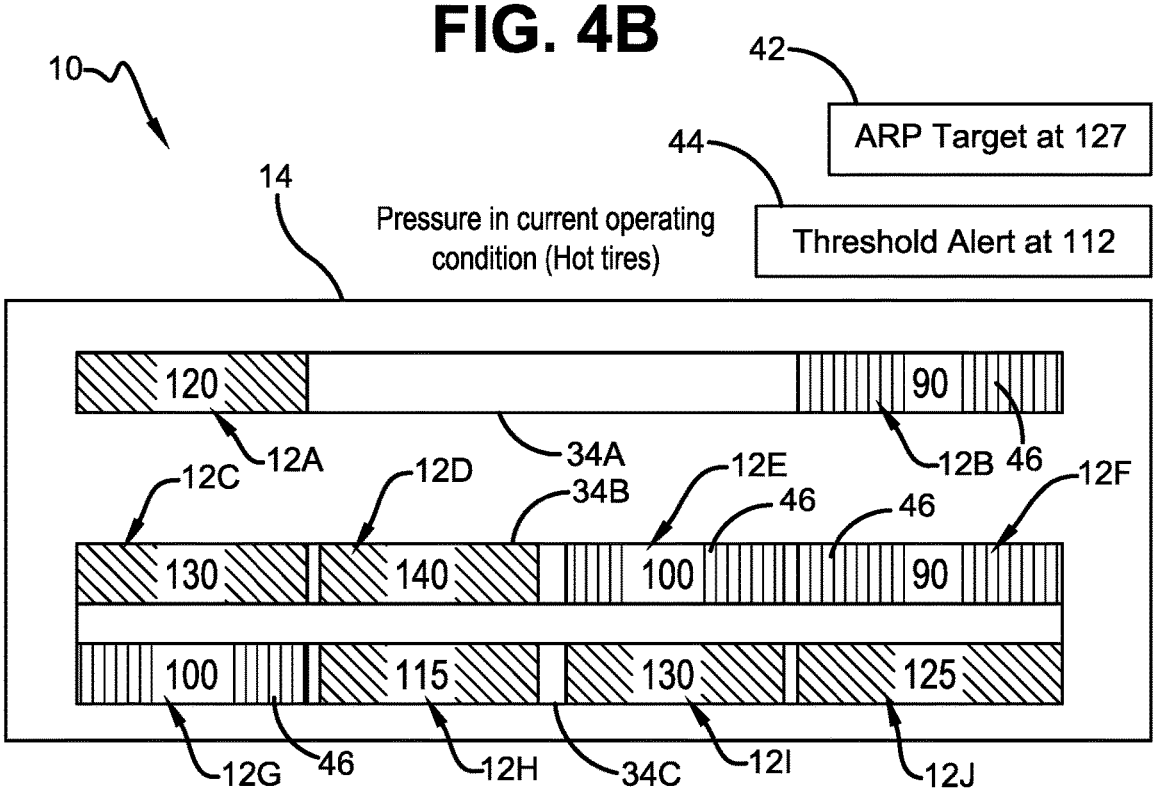
FIG. 4C is a schematic representation of a third aspect of the system for compensation of a drive over reader tire pressure measurement of the present invention shown in FIG. 1.

Referring to FIGS. 4A through 4C, by way of example, the vehicle 14 may include two front tires 12A and 12B, each of which is mounted on a front axle 34A, and eight additional tires mounted in dual-tire configurations on tandem axles 34B and 34C. The front tandem axle 34B includes two tires 12C and 12D on the left side of the axle, and two tires 12E and 12F on the right side of the axle. The rear tandem axle 34C includes two tires 12G and 12H on the left side of the axle, and two tires 12I and 12J on the right side of the axle. Each one of the tires 12 has a recommended cold pressure (RCP) 38 and a low pressure threshold 40. In this example, as shown in FIG. 4A, each tire 12 includes a target recommended cold pressure 38 that is 100 PSI, with a low pressure threshold 40 of 15 PSI below the recommended cold pressure, or 85 PSI.

As described above, and as shown in FIG. 4B, the drive over reader 26 determines a pressure indication 36 for each tire 12 on the vehicle 14. In this example, for the front axle 34A, the drive over reader 26 provides a first pressure indication 36A of 120 PSI for the left tire 12A, and a second pressure indication 36B of 90 PSI for the right tire 12B. For the front tandem axle 34B, a third pressure indication 36C of 130 PSI is provided for the tire 12C, a fourth pressure indication 36D of 140 PSI is provided for the tire 12D, a fifth pressure indication 36E of 100 PSI is provided for the tire 12E, and a sixth pressure indication 36F of 90 PSI is provided for the tire 12F. For the rear tandem axle 34C, a seventh pressure indication 36G of 100 PSI is provided for the tire 12G, an eighth pressure indication 36H of 115 PSI is provided for the tire 12H, a ninth pressure indication 36I of 130 PSI is provided for the tire 12I, and a tenth pressure indication 36J of 125 PSI is provided for the tire 12J.

The pressure indication 36 in FIG. 4B is based on cold pressure and not compensated for temperature, and as a result, all of the tires 12 are designated as having an acceptable pressure. However, the pressure indication 36 may be artificially high due to temperature, resulting in a tire that has an inflation pressure below the low pressure threshold 40 being designated as acceptable.

With particular reference to FIG. 4B and FIG. 4C, the system 10 compensates for temperature by converting the pressure indication 36 based on the recommended cold pressure 38 to an adjusted recommended pressure (ARP) 42, which accounts for temperature. More particularly, a group 46 of the tires 12 is selected for a comparison. It is to be understood that any of the tires 12 may be compared with one another, as the selected group may include tires on the same axle 34 or all of the tires on the vehicle 14. In this example, all of the tires 12 on the vehicle 14 are in the selected group.

The trend of the pressure indications 36 is assessed as to whether the indicated pressure based on the recommended cold pressure 38 is above the recommended cold pressure. Of the ten (10) tires 12, six are above the recommended cold pressure 38, the tires being 12A, 12C, 12D, 12H, 12I, and 12J. Two (2) tires, 12E and 12G, are at the recommended cold pressure 38, and two (2) tires, 12B and 12F, are below the recommended cold pressure. Based on this, the trend is for the pressure indications 36 to be above the recommended cold pressure 38.

The pressure indications 36 of the tires 12 that follow the trend are averaged. In this example, the pressure indication in tires 12A, 12C, 12D, 12H, 12I, and 12J are added up, yielding a total pressure of 760 PSI. The total of 760 PSI is divided by the number of tires in trend, which is six (6), to arrive at an average pressure of 126.67 or 127 PSI, which is the adjusted recommended pressure 42. The adjusted recommended pressure 42 accounts for temperature or heat effects on the tires 12. An adjusted low pressure threshold 44 is set below the adjusted recommended pressure 42. In this example, the adjusted low pressure threshold 44 is 15 PSI below the adjusted recommended pressure 42, or 112 PSI.

Using the adjusted recommended pressure 42 and the adjusted low pressure threshold 44, four (4) tires, 12B, 12E, 12F, and 12G are below the threshold. The drive over reader 26 generates a notice 46 for each tire 12B, 12E, 12F, and 12G that is below the adjusted low pressure threshold 44. Thus, the system 10 compensates the pressure indication 36 for temperature effects on each tire 12 due to operation of the vehicle 14.

The system 10 also accounts for a situation in which the tire 12 has been operated in cold ambient temperatures, and may yield a pressure indication 36 that is artificially low due to such low temperatures. When the tire 12 has been operated at low ambient temperatures, the trend is for the pressure indications 36 to be below the recommended cold pressure 38. In such a case, when the pressure indications 36 that follow the trend are averaged, the resulting adjusted recommended pressure 42 may be below the recommended cold pressure 38, thereby accounting for cold-temperature operation.

It is to be understood that other pressure and temperature conversions may be employed without affecting the overall concept or operation of the invention. For example, extreme high and/or low indications may be ignored, a mean instead of an average may be employed, and/or conversion of pressure differences to a temperature factor and back to an adjusted recommended pressure 42 may be employed.

Figure 5:
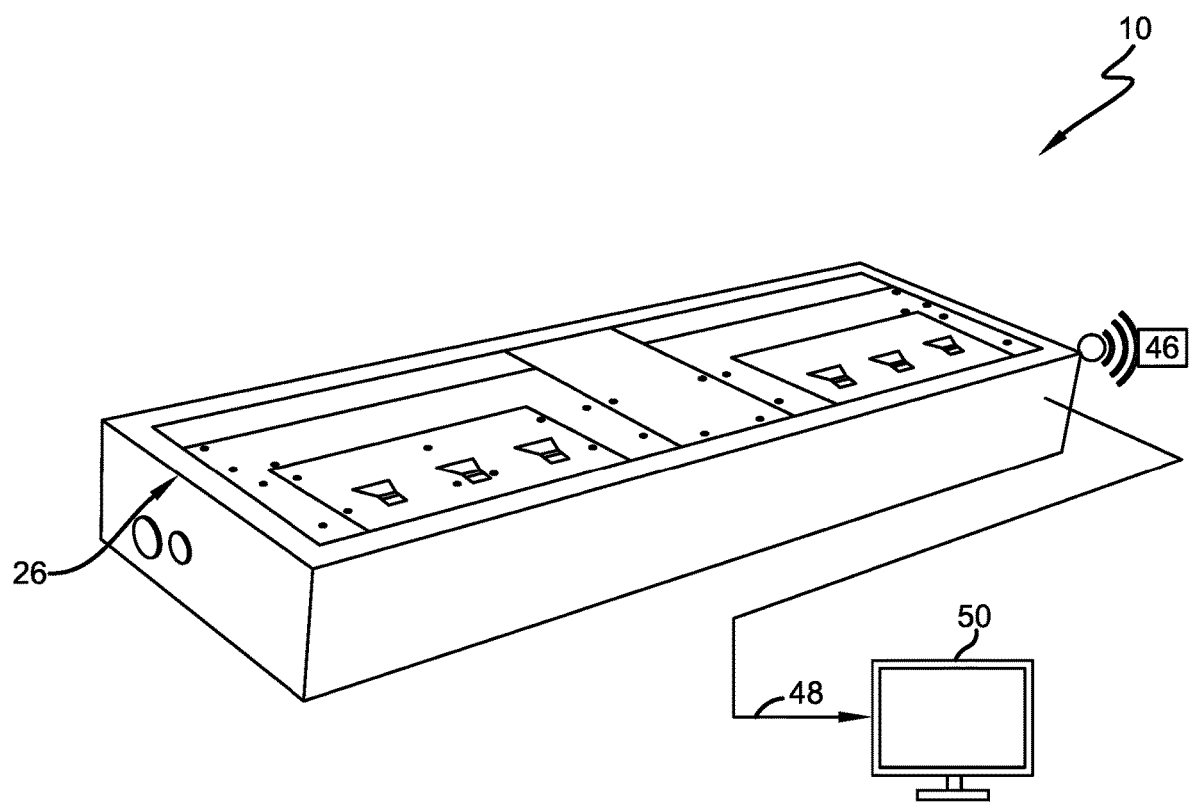
FIG. 5 is a schematic representation of a notification portion of the system for compensation of a drive over reader tire pressure measurement of the present invention shown in FIG. 1.

Turning to FIG. 5, as mentioned above, the system 10 includes and is incorporated into the drive over reader 26. When the notice 46 is generated, it is sent through wireless or wired transmission 48 along with any other pertinent drive over reader output to a receiving device 50. The receiving device 50 may be any device that communicates the notice 46 to a technician, vehicle operator, or a fleet manager, such as a computer with a display terminal, a user device, and/or a fleet management server.

In this manner, the system for compensation of a drive over reader tire pressure measurement 10 accounts and compensates for high temperature effects on a tire 12 from operation of the vehicle 14. By using an adjusted recommended pressure 42 that accounts for temperature, rather than the recommended cold pressure 38, the probability of a tire 12 with a low pressure being approved by the drive over reader 26 is reduced. The system 10 performs its compensation without the need to invade or access the tire cavity, and without a specific temperature sensor in the tires 12 or the drive over reader 26.

The present invention also includes a method for compensating for high temperature effects on a tire 12 from vehicle operation in a drive over reader tire pressure measurement. The method includes steps in accordance with the description that is presented above and shown in FIG. 1 through 5.

It is to be understood that the steps and accompanying structure of the above-described system and method for compensation of a drive over reader tire pressure measurement of the present invention 10 may be altered or rearranged, or components or steps known to those skilled in the art omitted or added, without affecting the overall concept or operation of the invention.

The invention has been described with reference to a preferred embodiment. Potential modifications and alterations will occur to others upon a reading and understanding of this description. It is to be understood that all such modifications and alterations are included in the scope of the invention as set forth in the appended claims, or the equivalents thereof.

What is claimed is:

1. A system for compensation of a drive over reader tire pressure measurement, the system including:
    a drive over reader including a sensor array;
    a pressure indication being determined for each tire in a group of tires by the drive over reader;
    a recommended cold pressure for the tires;
    an adjusted recommended pressure for the tires, the adjusted recommended pressure being determined from the pressure indication and the recommended cold pressure, the adjusted recommended pressure accounting for temperature effects on the tires;
    an adjusted low pressure threshold being set at a predetermined level below the adjusted recommended pressure; and
    a notice generated by the drive over reader for each tire that includes an adjusted recommended pressure below the adjusted low pressure threshold.

2. The system for compensation of a drive over reader tire pressure measurement of claim 1, wherein the adjusted recommended pressure includes an assessment of a trend of the pressure indications being above or below the recommended cold pressure.

3. The system for compensation of a drive over reader tire pressure measurement of claim 2, wherein the adjusted recommended pressure includes an average of the pressure indications that follow the trend.

4. The system for compensation of a drive over reader tire pressure measurement of claim 3, wherein the adjusted recommended pressure includes ignoring at least one of extreme high pressure indications and extreme low pressure indications.

5. The system for compensation of a drive over reader tire pressure measurement of claim 2, wherein the adjusted recommended pressure includes a mean of the pressure indications that follow the trend.

6. The system for compensation of a drive over reader tire pressure measurement of claim 1, wherein the adjusted recommended pressure includes conversion of pressure differences to a temperature factor.

7. The system for compensation of a drive over reader tire pressure measurement of claim 1, wherein the adjusted low pressure threshold is about fifteen pound per square inch below the adjusted recommended pressure.

8. The system for compensation of a drive over reader tire pressure measurement of claim 1, wherein the group of tires includes tires on the same axle.

9. The system for compensation of a drive over reader tire pressure measurement of claim 1, wherein the group of tires includes all of the tires on a vehicle.

10. The system for compensation of a drive over reader tire pressure measurement of claim 1, wherein the notice is transmitted to a receiving device, the receiving device including at least one of a computer with a display terminal, a user device, and a fleet management server.

11. The system for compensation of a drive over reader tire pressure measurement of claim 1, wherein the system determines the adjusted recommended pressure without invading a cavity of each tire.

12. The system for compensation of a drive over reader tire pressure measurement of claim 1, wherein the system determines the adjusted recommended pressure without a temperature sensor.

13. A method for compensating a drive over reader tire pressure measurement, the method including the steps of:
   providing a drive over reader including a sensor array;
   determining a pressure indication of each tire in a group of tires with the drive over reader;
   providing a recommended cold pressure for the tires;
   determining an adjusted recommended pressure for the tires from the pressure indication and the recommended cold pressure, the adjusted recommended pressure accounting for temperature effects on the tires;
   setting an adjusted low pressure threshold at a predetermined level below the adjusted recommended pressure; and
   generating a notice with the drive over reader for each tire that includes an adjusted recommended pressure below the adjusted low pressure threshold.

14. The method for compensating a drive over reader tire pressure measurement of claim 13, wherein the step of determining an adjusted recommended pressure includes assessing a trend of the pressure indications being above or below the recommended cold pressure.

15. The method for compensating a drive over reader tire pressure measurement of claim 14, wherein the step of determining an adjusted recommended pressure includes averaging the pressure indications that follow the trend.

16. The method for compensating a drive over reader tire pressure measurement of claim 15, wherein the step of determining an adjusted recommended pressure includes ignoring at least one of extreme high pressure indications and extreme low pressure indications.

17. The method for compensating a drive over reader tire pressure measurement of claim 14, wherein the step of determining an adjusted recommended pressure includes calculating a mean of the pressure indications that follow the trend.

18. The method for compensating a drive over reader tire pressure measurement of claim 13, wherein the step of determining an adjusted recommended pressure includes converting the pressure differences to a temperature factor.

19. The method for compensating a drive over reader tire pressure measurement of claim 13, wherein the group of tires includes all of the tires on a vehicle.

20. The method for compensating a drive over reader tire pressure measurement of claim 13, further comprising the step of transmitting the notice to a receiving device, the receiving device including at least one of a computer with a display terminal, a user device, and a fleet management server.

* * * * *